United States Patent
Schwartz et al.

(10) Patent No.: US 7,050,908 B1
(45) Date of Patent: May 23, 2006

(54) LANE MARKER PROJECTION METHOD FOR A MOTOR VEHICLE VISION SYSTEM

(75) Inventors: David A. Schwartz, Moorpark, CA (US); Lisa R. Hamilton, Simi Valley, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/087,041

(22) Filed: Mar. 22, 2005

(51) Int. Cl.
G06G 7/78 (2006.01)
G06F 15/50 (2006.01)

(52) U.S. Cl. .................. 701/300; 701/301; 701/23; 701/28; 382/104

(58) Field of Classification Search .............. 382/104, 382/148, 293; 701/28, 41, 300, 301; 702/167; 348/118, 106, 116; 345/156, 169; G06K 9/00; G06G 7/78; G09G 5/00; G06F 15/50
See application file for complete search history.

(56) References Cited

U.S. PATENT DOCUMENTS

| | | | | |
|---|---|---|---|---|
| 4,970,653 A * | 11/1990 | Kenue | ........................ | 701/301 |
| 5,467,634 A * | 11/1995 | Brady et al. | .................. | 73/1.79 |
| 5,473,931 A * | 12/1995 | Brady et al. | .................. | 73/1.75 |
| 5,809,161 A * | 9/1998 | Auty et al. | .................. | 382/104 |
| 6,035,253 A * | 3/2000 | Hayashi et al. | .............. | 701/211 |
| 6,134,509 A * | 10/2000 | Furusho et al. | .............. | 702/167 |
| 6,292,752 B1 * | 9/2001 | Franke et al. | ................ | 701/300 |
| 6,647,328 B1 * | 11/2003 | Walker | .......................... | 701/36 |
| 6,708,087 B1 * | 3/2004 | Matsumoto | ..................... | 701/1 |
| 6,765,480 B1 * | 7/2004 | Tseng | ........................ | 340/425.5 |
| 6,807,287 B1 * | 10/2004 | Hermans | ..................... | 382/104 |
| 6,819,779 B1 * | 11/2004 | Nichani | ....................... | 382/104 |
| 6,868,168 B1 * | 3/2005 | Tsuji | ........................... | 382/104 |
| 6,888,447 B1 * | 5/2005 | Hori et al. | .................. | 340/435 |
| 6,977,630 B1 * | 12/2005 | Donath et al. | ................. | 345/7 |
| 2001/0035880 A1 * | 11/2001 | Musatov et al. | ............ | 345/764 |
| 2001/0056544 A1 * | 12/2001 | Walker | ........................ | 713/200 |
| 2002/0198632 A1 * | 12/2002 | Breed et al. | .................... | 701/1 |
| 2003/0023614 A1 * | 1/2003 | Newstrom et al. | ........ | 707/104.1 |
| 2003/0123705 A1 * | 7/2003 | Stam et al. | .................. | 382/104 |
| 2003/0128182 A1 * | 7/2003 | Donath et al. | .............. | 345/156 |
| 2004/0042638 A1 * | 3/2004 | Iwano | ......................... | 382/104 |
| 2004/0049324 A1 * | 3/2004 | Walker | .......................... | 701/1 |
| 2004/0066376 A1 * | 4/2004 | Donath et al. | .............. | 345/169 |
| 2004/0143381 A1 * | 7/2004 | Regensburger et al. | ........ | 701/36 |
| 2004/0183905 A1 * | 9/2004 | Comaniciu et al. | .......... | 348/148 |

FOREIGN PATENT DOCUMENTS

DE 197 49 086 * 11/1997
JP 2003322522 A * 11/2003

OTHER PUBLICATIONS

Dickmanns, E. D. and Zapp, A., A curvature-based scheme for improving road vehicle guidance by computer vision, Proc. SPIE on Mobile Robots, vol. 727, Oct. 1986, pp. 161-168.*

(Continued)

*Primary Examiner*—Cuong Nguyen
(74) *Attorney, Agent, or Firm*—Stefan V. Chmielewski

(57) ABSTRACT

Lane marker coordinate data obtained from a previous frame of a vehicle vision system is projected into the current video frame based on measured translation and rotation of the host vehicle. The projected lane marker coordinate data is consolidated with lane marker coordinate data from the current video frame for lane detection or display applications.

6 Claims, 3 Drawing Sheets

OTHER PUBLICATIONS

Z. Zomotor et al., Sensor fusion for improved vision based lane recognition and object tracking with range finders, IEEE Conference on Intelligent Transportation Systems, pp. 595-600, published in 1998.*

Jin-Chuan Hsu et al., Estimations of previewed road curvatures and vehicular motion by a vision-based data fusion scheme, Machine Visiion and Applications, 1997, vol. 9, pp. 179-192.*

* cited by examiner

LANE MARKER PROJECTION METHOD FOR A MOTOR VEHICLE VISION SYSTEM

TECHNICAL FIELD

The present invention relates to motor vehicle vision system applications that track or display the location of the vehicle relative to roadway lane markers, and more particularly to a method of consolidating lane marker position information from successively generated video images.

BACKGROUND OF THE INVENTION

Motor vehicle forward vision data generated by a video camera mounted at or near the driver's eye level can be processed to identify various items of interest such as roadway lane markers. The vision system can then determine the location of the vehicle relative to the lane markers, for displaying video information to the driver or for detecting lane changing and/or driving patterns indicative of a drowsy driver. Most of these applications require lane marker detection in a region of about 5–30 meters forward of the vehicle, where the lane markers can be reliably approximated as straight lines. However, dashed or periodic lane markers can have relatively large gaps, and frequently only a fraction of a lane marker is visible to the camera in any given video frame, particularly in mechanizations where a portion of the roadway within the video frame is obscured by the hood or fenders of the vehicle. Since this can degrade the ability of the lane tracking system to perform the intended functions, it would be beneficial if the information obtained from successively generated video images could be consolidated to provide more complete lane marker data, either for display or lane detection purposes.

SUMMARY OF THE INVENTION

The present invention is directed to a method of consolidating lane marker position information by projecting lane marker information from a previously generated video frame into a current video frame. Projecting the lane marker information involves transforming the detected markers from the previous frame to world coordinates, and predicting their position in the current video frame based on measured vehicle rotation and translation parameters. The projected marker coordinates can be combined with world coordinates of lane markers from the current video frame for lane detection applications, or converted to image plane coordinates and combined with lane marker image plane coordinates of the current video frame for driver display purposes.

DESCRIPTION OF THE PREFERRED EMBODIMENT

Figure 1A:
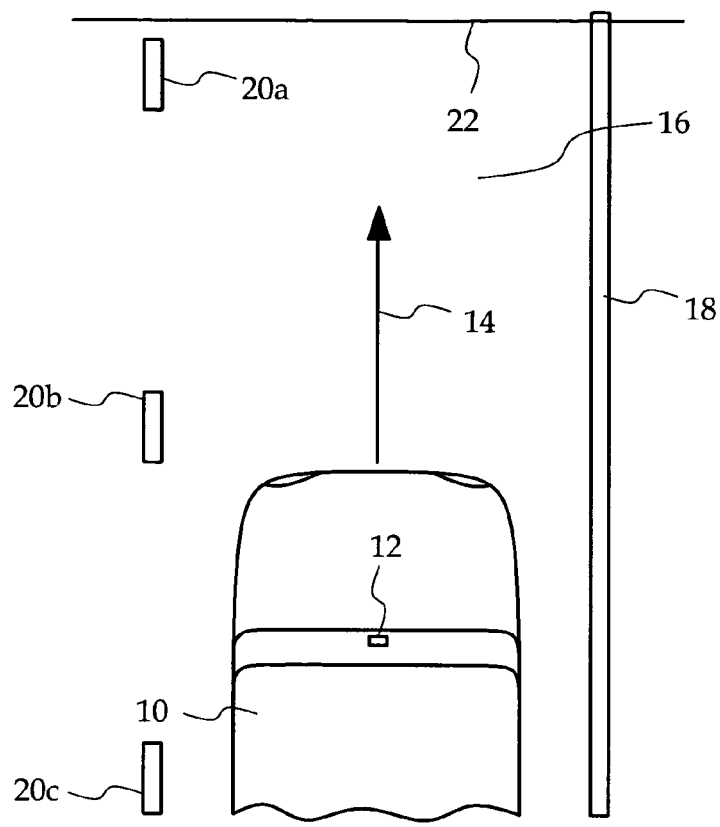
FIG. 1A and FIG. 1B respectively depict world coordinate and image plane coordinate representations of first and second video frames generated by a vehicle-mounted video camera.
Figure 1B:
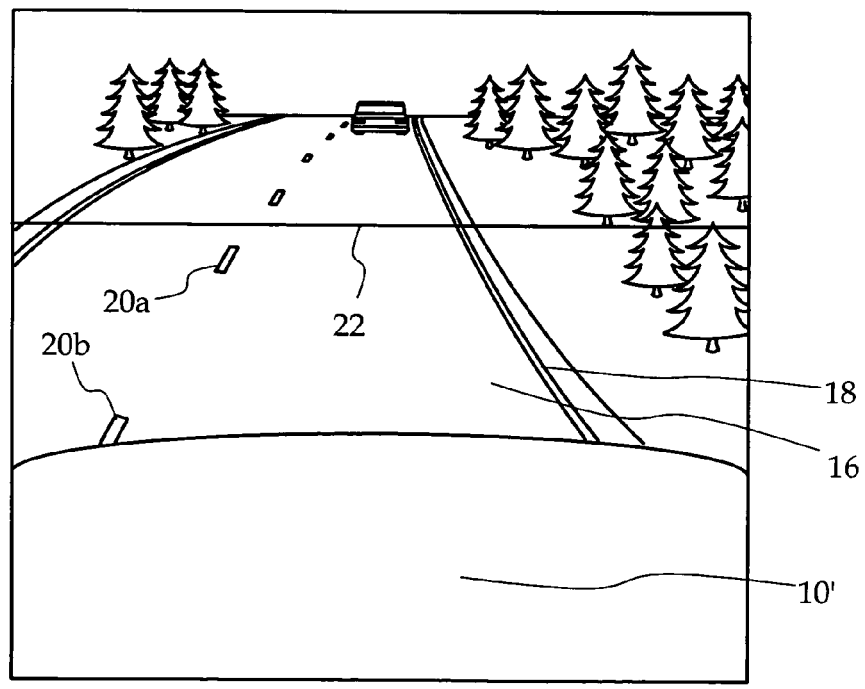

The method of the present invention is carried out in a vehicle-mounted vision system designed, among other things, to capture video images of a scene in the forward path of the vehicle for analysis and/or display to the driver. One of the principle objectives of the video image analysis is to identify lane markers painted on the roadway and the location of the host vehicle relative to the markers. FIG. 1A is a real world or overhead view of a host vehicle 10 equipped with a video camera 12 mounted in the passenger compartment, in the vicinity of an interior rearview mirror, for example. The vehicle 10 is traveling in the direction of arrow 14 down a two-lane roadway 16. The reference numeral 18 designates a continuous lane marker for the edge of roadway 16, and the reference numerals 20a, 20b, 20c designate center lane marker segments dividing the two lanes of roadway 16. FIG. 1B presents an image plane view forward of the vehicle 10 as seen by the camera 12. As illustrated in the figure, the image plane view does not include areas alongside or just forward of the vehicle 10 due to the placement of the camera 12 and obstruction of the vehicle's hood and fenders, designated in FIG. 1B by the reference numeral 10'.

The principle region of interest for purposes of lane marker identification and tracking comprises the portions of the roadway approximately 5–30 meters forward of the vehicle 10. The outside boundary of this region within the real world and image plane views of FIGS. 1A and 1B is depicted by the line 22. Due to the limited depth of the region of interest, the vision system can utilize straight line approximation for lane marker tracking, even on a curved roadway such as depicted in FIG. 1B. However, the obstructed portion of this region (i.e., the portion just forward of the vehicle 10) can often include useful lane marker information, particularly in cases where the center lane marker is dashed.

Figure 2:
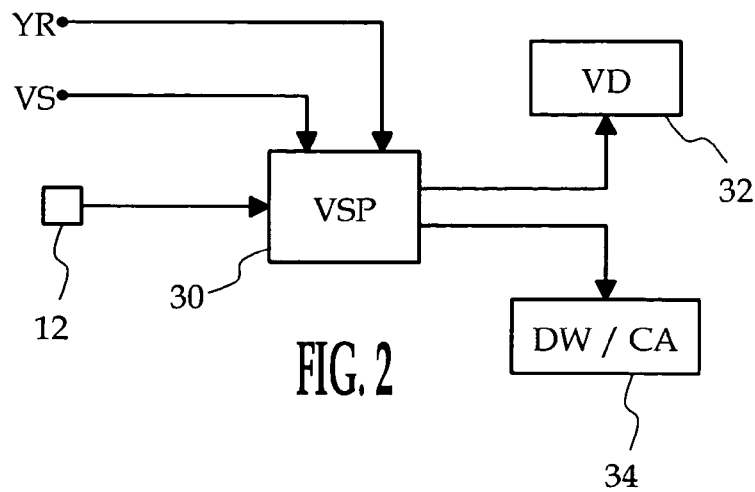
FIG. 2 is a block diagram of a system for carrying out the method of the present invention.

The present invention enhances the available information by projecting lane marker coordinate data from a previous video frame into the current video frame and consolidating the projected and current lane marker coordinate data to provide a more complete representation of the lane markers and their position with respect to the host vehicle, whether the lane marker data is used for display purposes or lane tracking algorithms. Projection of the previously captured lane marker coordinate data involves characterizing the vehicle's movement in terms of its speed (translation) and yaw rate (rotation) or similar parameters. Thus, a system for carrying out the method of the present invention is represented by the block diagram of FIG. 2, where video data from the camera 12 is supplied along with vehicle speed (VS) and yaw rate (YR) data to a video signal processor (VSP) 30. The VSP 30 analyzes the region of interest in each successive video frame produced by camera 12, identifies lane marker coordinates in the region, and forms a straight-line approximation of the identified markers. According to the method of this invention, the VSP 30 additionally utilizes the measured vehicle movement parameters (VS and YR) to generate the projected lane marker coordinate data and to consolidate it with the lane marker coordinate data from the current video frame. The consolidated lane marker coordinate data can be supplied in image frame format to the video display (VD) 32, and in world format to the block 34, which represents a drowsy driver (DD) and/or collision avoidance (CA) algorithm executed either by VSP 30 or another processor of the system.

Figure 3:
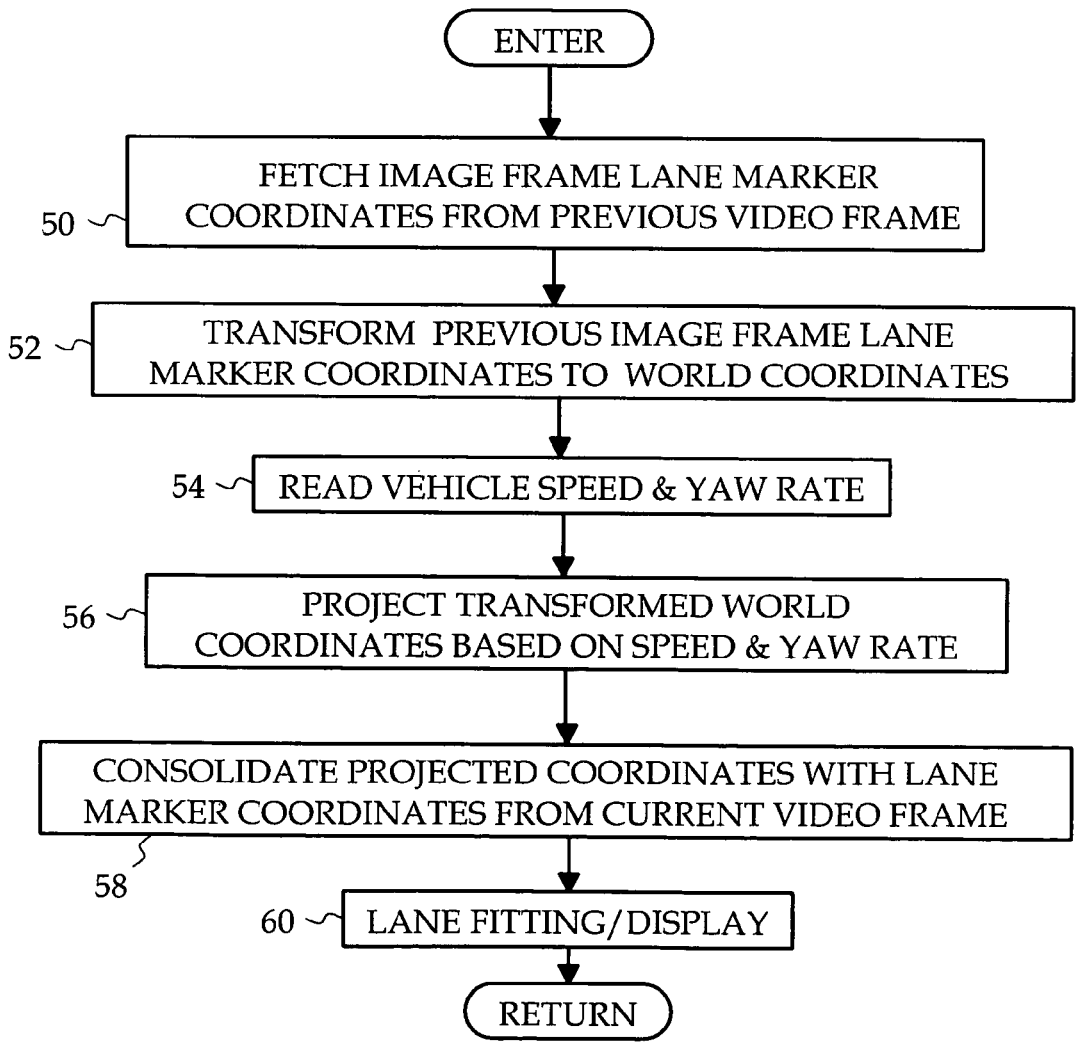
FIG. 3 is a flow diagram depicting the method of this invention.

Referring to the flow diagram of FIG. 3, the method of the present invention involves, for each successive video frame acquired from camera 12, fetching lane marker coordinates identified in the previous fame of video data (block 50), transforming the prior lane marker coordinates to world coordinates (block 52), obtaining the vehicle movement parameters (block 54), projecting the transformed coordinates based on the obtained vehicle movement parameters (block 56), and consolidating the projected and current lane marker coordinates (block 58). The consolidated coordinates may then be transformed back to the image plane for driver display and/or supplied directly to a lane tracking/fitting algorithm (block 60). While the preferred approach is to consolidate the projected and current lane marker data using world coordinates, the data may alternatively be consolidated using image plane coordinates. At any rate, the video processing techniques involved in identifying lane marker coordinates in a given video frame and transforming image plane coordinates to corresponding world coordinates, and vice-versa, are well understood to those skilled in the video processing art, and therefore are not specifically described herein.

As mentioned above, the projection of lane marker coordinates from a given video frame to the next successive video frame according to this invention involves translating the coordinates based on vehicle speed VS and rotating the coordinates based on yaw rate YR. The starting point is the world coordinate pair (x, y) of a previously identified lane marker, where the x-coordinate represents down-range distance from the vehicle 10 and the y-coordinate represents cross-range distance from the vehicle's central longitudinal axis (as may be represented by the arrow 14 in FIG. 1A). The measured vehicle movement parameters ultimately define the distance traveled d and change in heading $\phi$ between successive video frames. In the following discussion the frame notations ("n" for a previously generated image frame and "n+1" for a subsequently generated image frame) are shown as superscripts instead of subscripts to avoid conflict with the subscripted designations applied to some of the parameters. Given the vehicle speed $S^{(n)}$ in m/sec and yaw rate $\chi^{(n)}$ in radian/sec at time n, the distance $d^{(n)}$ is given by the product $d^{(n)}=T*s^{(n)}$ where T is the inverse image frame rate of the camera 12 in seconds, and the change in heading $\phi^{(n)}$ is given by the product $\phi^{(n)}=-T*\chi^{(n)}$. Moving at speed s, and yaw rate $\chi$ between successive video frames, the host vehicle 10 will translate from coordinate (0, 0) to coordinate $(\Delta x^{(n)}, \Delta y^{(n)})$, and change its relative heading by $\phi^{(n)}$, where the translation coordinates $\Delta x^{(n)}$ and $\Delta y^{(n)}$ are given by:

$$\Delta x^{(n)}=d^{(n)}\cos\phi^{(n)}, \text{ and}$$

$$\Delta y^{(n)}=d^{(n)}\sin\phi^{(n)}$$

This frame-to-frame origin shift of the vehicle is applied to the lane marker coordinates of the prior video frame. For any such coordinate pair $(x_i^{(n)}, y_i^{(n)})$, the projected coordinate pair in the next video frame, $(\tilde{x}_i^{(n+1)}, \tilde{y}_i^{(n+1)})$, is given by:

$$\tilde{x}_i^{(n+1)}=(x_i^{(n)}-\Delta x^{(n)})\cos\phi^{(n)}+(y_i^{(n)}-\Delta y^{(n)})\sin\phi^{(n)}, \text{ and}$$

$$\tilde{y}_i^{(n+1)}=-(x_i^{(n)}-\Delta x^{(n)})\sin\phi^{(n)}+(y_i^{(n)}-\Delta y^{(n)})\cos\phi^{(n)}$$

The terms $(x_i^{(n)}-\Delta x^{(n)})$ and $(y_i^{(n)}-\Delta y^{(n)})$ account for the vehicle translation, while the functions $\cos\phi^{(n)}$ and $\sin\phi^{(n)}$ account for the vehicle rotation.

Figure 4A:
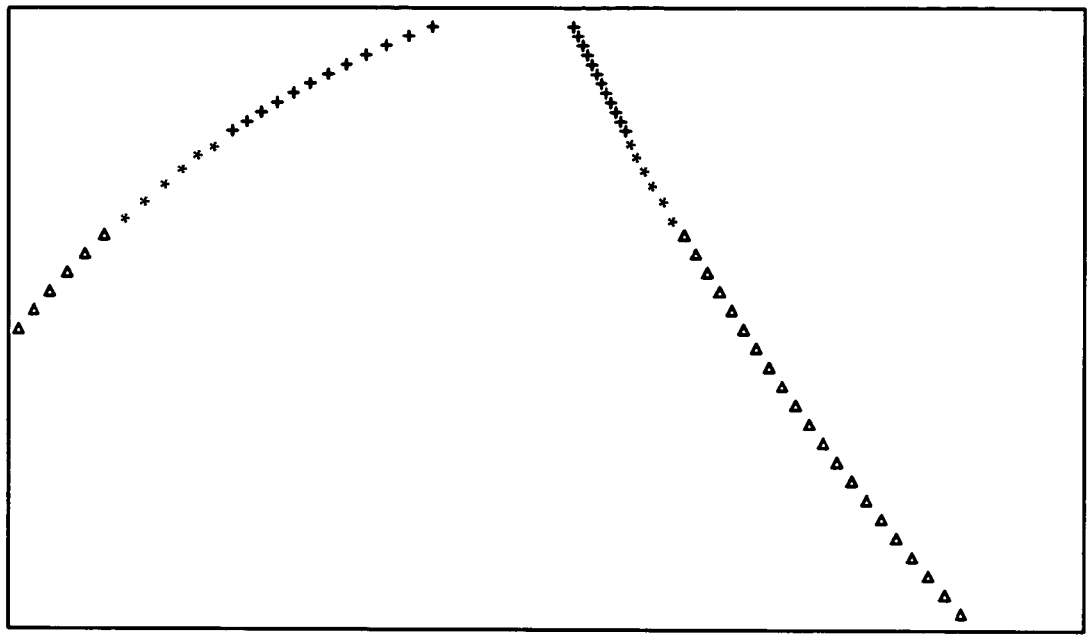
FIGS. 4A and 4B respectively depict image plane coordinate and world coordinate representations of lane marker information consolidated from the first and second video frames of FIGS. 1A and 1B according to the method of this invention.
Figure 4B:
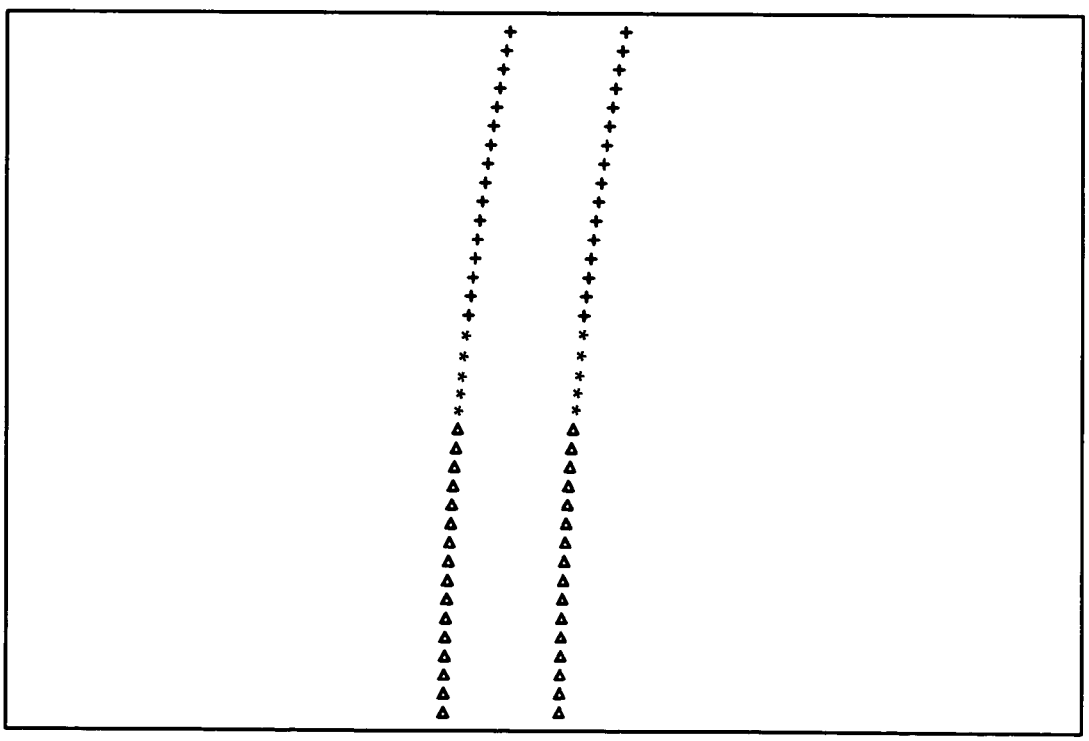

FIGS. 4A and 4B respectively depict image plane and world representations of the consolidated lane marker coordinates, where current coordinates are designated by the plus signs, projected coordinates are designated by the small triangles, and regions of coordinate overlap are designated by the asterisks. The format of FIG. 4A is most useful for display applications, while the format of FIG. 4B is most useful for video processing applications such as lane tracking.

In summary, the present invention provides simple and cost-effective method of consolidating identified coordinates of images successively generated by a vehicle vision system. The consolidated coordinates provide enhanced display and improved lane marker tracking. While the method of the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of operation for a vision system that identifies lane marker coordinates in successively generated video images of a roadway in a travel path of a vehicle, comprising the steps of:
   obtaining world lane marker coordinate data from a previously generated video image;
   determining a speed and a yaw rate of the vehicle;
   projecting the obtained world lane marker coordinate data into a subsequently generated video image based on the determined speed and yaw rate and a time interval between the previously and subsequently generated video images;
   consolidating the projected lane marker coordinate data with lane marker coordinate data from the subsequently generated video image; and
   processing the consolidated lane marker coordinate data.

2. The method of claim 1, wherein the vision system identifies image frame lane marker coordinates, and the step of obtaining world lane marker coordinate data includes the step of:
   transforming the identified image frame lane marker coordinates from the previously generated video image to corresponding world coordinates.

3. The method of claim 1, including the step of:
   consolidating the projected world lane marker coordinate data with world lane marker coordinate data from the subsequently generated video image.

4. The method of claim 1, including the steps of:
   transforming the projected world lane marker coordinate data to corresponding image frame coordinate data for consolidation with image frame coordinate data from the subsequently generated video image.

5. The method of claim 1, where the step of projecting the obtained world lane marker coordinate data into a subsequently generated video image includes the steps of:
   determining a translation $d''$ of the vehicle between the previously and subsequently generated video images based on a product of the determined speed and said time interval; and
   determining a change in relative heading $\phi''$ of the vehicle between the previously and subsequently generated video images based on a product of the determined yaw rate and said time interval.

6. The method of claim 5, wherein the projected world lane marker coordinate data $(x''^{+1}, y''^{+1})$ is given by $$x''^{+1}=(x''-\Delta x'')\cos\phi''+(y''-\Delta y'')\sin\phi'' \text{ and}$$

$$y''^{+1}=\neq(x''-\Delta x'')\sin\phi''+(y''-\Delta y'')\cos\phi''$$

where $(x'', y'')$ is the obtained world lane marker coordinate data, $\Delta x''$ is given by a product of $d''$ and $\cos\phi''$, and $\Delta y''$ is given by a product of $d''$ and $\sin\phi''$.

* * * * *